Patented July 5, 1949

2,475,535

UNITED STATES PATENT OFFICE 2,475,535

DYNAMOELECTRIC MACHINE WITH LAMINATED INTERPOLE FLUX PATH

Chester O. Weilbaecher, Milwaukee, Wis., assignor to Allis-Chalmers Manufacturing Company, Milwaukee, Wis., a corporation of Delaware Application August 3, 1946, Serial No. 688,323

10 Claims. (Cl. 171—228)

This invention relates in general to dynamoelectric machines and more particularly to dynamoelectric machines in which commutation of the armature current is aided by means of interpoles.

In prior art dynamoelectric machines utilizing interpoles to aid commutation, the interpole flux path includes the machine yoke, which is of solid, rather than laminated conducting material. The proper functioning of the interpoles over a range of loads necessitates that the interpoles supply a value of commutating magnetic flux that is exactly proportional to the value of the current to be commutated. In these prior art dynamoelectric machines, this proper functioning of the interpoles is inhibited whenever the value of load current is changed suddenly, by reason of the eddy currents induced around the cross section of the solid yoke due to the high rate of change of flux linkages with time. The great disadvantage of this prior art structure is due to the fact that the proper proportionality between load current and commutating or interpole flux is instantaneously lost during transient loads, with consequent impairment of the commutation process.

Attempts have been made to avoid the undesirable effects of the solid yoke on the commutating flux by supplementing the interpole circuit with an external inductive shunt. Such shunts have been constructed with a higher inductive time constant than that of the interpole magnetic circuit in the machine. In this way extra components of current were sent through the interpole circuit during transient current changes and these extra components of current partially compensated for the eddy currents induced in the solid yoke. This attempt at correction was not fully satisfactory, in that correction of the effect of one undesirable current was attempted by means of another artificially inserted current intended to cancel the effect of the first current. Such external shunt provided additional error due to the difficulty of adjustment of the time phase between the two currents and therefore the interpole flux was additionally out of phase with and not proportional to the load current. Such external shunts were bulky external devices that required considerable adjustment and which provided considerable error by reason of the fact that the temperature variation of the external inductive shunt and the machine interpole circuit proper were not kept in step with each other.

It is therefore an object of the present invention to provide a magnetic path for the interpole flux of a dynamoelectric machine such that will avoid the above disadvantages.

It is also an object of the present invention to provide a magnetic path for the interpole flux of a dynamoelectric machine that is entirely free from solid rather than laminated conducting structure, so that such flux will be free to change at a rapid rate without inducing eddy currents and will therefore stay sensibly in phase with and remain instantaneously proportional to the current to be commutated.

It is a further object of the present invention to provide a dynamoelectric machine with a laminated interpole sub-yoke to carry the interpole flux around the periphery of the dynamoelectric machine without such flux traversing the solid main yoke of the dynamoelectric machine.

It is a further object of the present invention to provide in a dynamoelectric machine having a main solid yoke, a means for isolating the interpole flux from the main solid yoke of the dynamoelectric machine.

It is a further object of the present invention to provide an interpole circuit that is quickly responsive magnetically.

Objects and advantages other than those above set forth will be apparent from the following description when read in connection with the accompanying drawing, in which.

Figure 1:
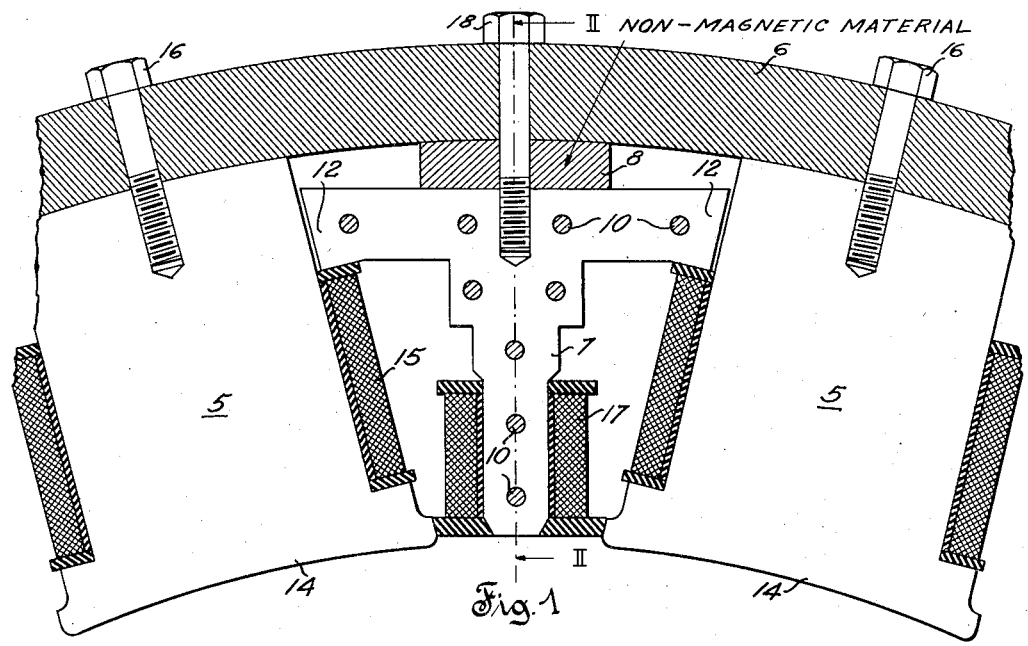
Fig. 1 is a fragmentary sectional view through certain stator portions of a dynamoelectric machine.
Figure 2:
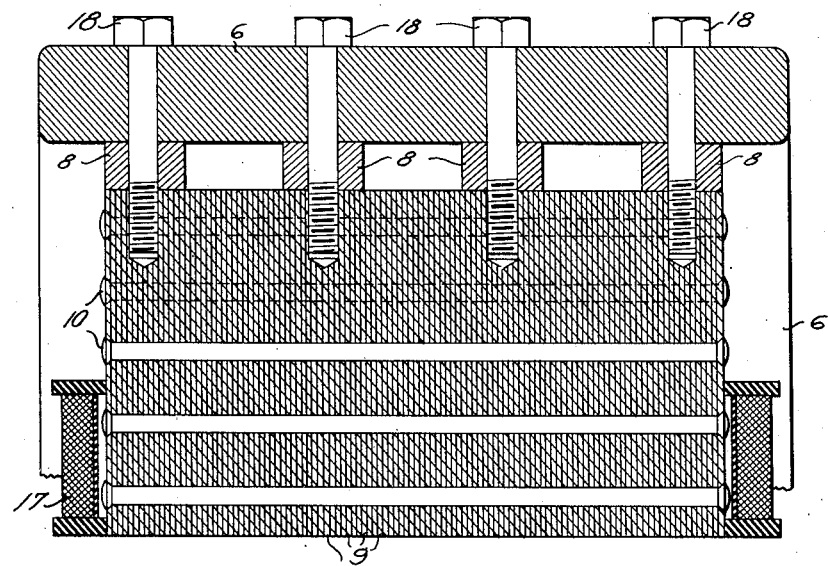
Fig. 2 is a section view taken on the line II—II of Fig. 1.

As shown in Figs. 1 and 2, the yoke 6 of a dynamoelectric machine has main poles 5 mounted along the inner periphery thereof and held in place by a suitable means such as the bolt 16 shown. The main poles 5 are provided with pole faces 14 adjacent the rotatable armature (not shown), that completes the magnetic circuit between the poles 5. The main pole 5 has main field windings 15 thereon, which, as shown in Fig. 3 may be energized from any suitable source of current as indicated in Fig. 3.

Figure 3:
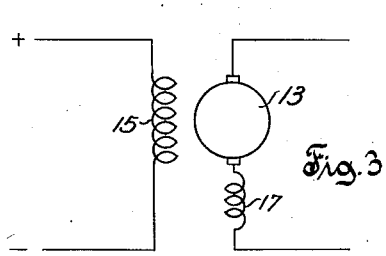
Fig. 3 is a diagram showing the connections of parts shown in Figs. 1 and 2.

An interpole 7 is provided between the main poles 5 and the interpole winding 17 thereon carries the load current as shown by the diagram of Fig. 3. As shown more clearly in Fig. 2, the interpole 7 is made up of laminations 9 electrically insulated from each other to prevent eddy currents from being induced therein by reason of change in current in the winding 17. The interpole 7 is provided with T-shaped extensions 12 thereon terminating adjacent main poles 5, thus providing a path for the interpole magnetic flux through the main poles 5.

The interpole magnetic flux is prevented from threading through the solid yoke 6 by means of spacers 8 of some suitable non-magnetic material. In the preferred form of the invention the non-magnetic spacers 8 have been made of brass, in order to provide, in conjunction with the bolts 18, a desirable support of the interpole 7 from the yoke 6. The laminations 9 of the interpole 7 are suitably held in the position shown in Fig. 2, as by means of rods 10, which are suitably insulated from the laminations 9 to prevent eddy currents therein.

The above described structure provides isolation of the interpole flux from the main yoke 6. The main poles 5 which form a part of the path for the interpole flux are of laminated construction such as will minimize eddy currents. Although the main poles 5 form a part of the peripheral path for the main flux, the main pole flux and the interpole flux components are in quadrature, and therefore no interference is had. The laminated structure of the main poles 5 may be insulated similarly to that of the interpole 7. The advantage of quick response of the interpole flux to changes in current greatly improves transient commutation with consequent reduction in maintenance and with higher permissible output of the dynamoelectric machine. A dynamoelectric machine utilizing the present invention is particularly applicable to that type of service in which a very considerable part of the load is of transient nature such as is characteristic in reversing rolling mill installations.

Although but one embodiment of the present invention has been illustrated and described, it will be apparent to those skilled in the art that various changes and modifications may be made without departing from the spirit of the invention or from the scope of the appended claims.

It is claimed and desired to secure by Letters Patent:

1. A dynamoelectric machine provided with a first magnetic path comprising a plurality of main poles and a yoke, a second magnetic path comprising said main poles and an interpole which is constructed and arranged to carry substantially all of the flux of said interpole and substantially none of the flux of said main poles, and means magnetically separating said second magnetic path from said yoke.

2. A dynamoelectric machine comprising a first magnetic path comprising a plurality of laminated main poles and a non-laminated yoke supporting said main poles and carrying substantially the entire main pole flux, a second magnetic path comprising a laminated interpole and said laminated main poles, said second path comprising a laminated portion shunting said yoke between said main poles, and means for securing said interpoles in magnetically isolated relation to said yoke.

3. A dynamoelectric machine comprising a yoke, a plurality of main poles, an interpole between two of said main poles and provided with a first portion immediately adjacent one of said main poles and a second portion immediately adjacent the other of said main poles for carrying substantially all the flux of said interpole and substantially none of the flux of said main poles, and means for magnetically isolating said interpole from said yoke.

4. A dynamoelectric machine comprising a yoke, an armature, a plurality of main poles supported in magnetically conductive relation to said yoke and said armature and provided with pole faces at one end thereof, a T-shaped interpole between said main poles and positioned with the lower end of said T adjacent said armature and with the upper ends of said T adjacent said main poles at portions thereof substantially away from said pole faces.

5. A dynamoelectric machine comprising a yoke, a plurality of main poles, an interpole between two of said main poles and provided with a first portion immediately adjacent one of said main poles and a second portion immediately adjacent the other of said main poles for carrying substantially all the flux of said interpole and substantially none of the flux of said main poles, and means for magnetically isolating said interpole from said yoke, said means comprising a spacer of non-magnetic material between said interpole and said yoke.

6. A dynamoelectric machine comprising a yoke, an armature, a plurality of main poles supported in magnetically conductive relation to said yoke and provided with pole faces adjacent said armature, a T-shaped interpole between said main poles and positioned with the lower end of said T adjacent said armature and with the upper ends of said T adjacent said main poles at portions thereof substantially away from said pole faces.

7. A dynamoelectric machine comprising a yoke, a plurality of main poles, an interpole between two of said main poles and provided with a first portion immediately adjacent one of said two main poles and a second portion immediately adjacent the other of said two main poles, and means supporting said interpole in a position forming a relatively small gap between said interpole and each of said two main poles and a relatively wide gap between said interpole and said yoke to cause substantially all the interpole flux to flow through said two main poles and substantially all the main pole flux to be excluded from said interpole.

8. A dynamoelectric machine comprising a yoke, a main pole having a winding and a pole piece, an interpole provided with a portion immediately adjacent said main pole, and means supporting said interpole to cause said portion of said interpole to press said winding firmly against said pole piece.

9. A dynamoelectric machine comprising a yoke, an armature, a plurality of interpoles, a main pole disposed between two of said interpoles and supported in magnetically conductive relation to said yoke, each of said two interpoles having a portion adjacent said main pole and a portion adjacent said armature to define a magnetic circuit comprising said two interpoles, said armature and said main pole, whereby said magnetic circuit carries substantially all the interpole flux and substantially no main pole flux.

10. A dynamoelectric machine comprising a yoke, an armature, a plurality of interpoles, a main pole disposed between two of said interpoles and having a pole face portion adjacent said armature and a yoke engaging portion, said main pole providing a magnetic path for main pole flux from said yoke in a longitudinal direction through said yoke engaging portion and said pole face portion of said main pole to said armature, each of said two interpoles having a portion adjacent said yoke engaging portion of said main pole and a portion adjacent said armature to define a magnetic circuit extending through said armature, through said interpoles, and in a transverse direction through said yoke engaging portion of said main pole; whereby said main pole flux and said interpole flux are in quadrature in said yoke engaging portion.

CHESTER O. WEILBAECHER.

REFERENCES CITED

The following references are of record in the file of this patent:

UNITED STATES PATENTS

| Number | Name | Date |
|---|---|---|
| 564,559 | Eickemeyer | July 21, 1896 |
| 1,115,724 | Nies | Nov. 3, 1914 |
| 1,523,004 | Doherty | Jan. 13, 1925 |

FOREIGN PATENTS

| Number | Country | Date |
|---|---|---|
| 6,651 | Great Britain | 1906 |